United States Patent [19]

Tyerman

[11] Patent Number: 5,286,547
[45] Date of Patent: Feb. 15, 1994

[54] METHOD OF MAKING A PROTECTIVE AND/OR DECORATIVE COATING AND THE COATING MADE BY THIS METHOD

[75] Inventor: David W. Tyerman, Yverdon-les-Bains, Switzerland

[73] Assignee: Actino S.A., Switzerland

[21] Appl. No.: 459,789

[22] PCT Filed: Jun. 22, 1989

[86] PCT No.: PCT/CH89/00118
§ 371 Date: Feb. 22, 1990
§ 102(e) Date: Mar. 15, 1990

[87] PCT Pub. No.: WO89/12511
PCT Pub. Date: Dec. 28, 1989

[30] Foreign Application Priority Data

Jun. 23, 1988 [FR] France .................. 88 08629

[51] Int. Cl.⁵ .......................... B32B 3/00; B32B 27/14
[52] U.S. Cl. ..................................... 428/195; 156/281; 156/310; 427/258; 427/412.1; 428/201; 428/507; 428/542.2

[58] Field of Search ................. 264/245; 427/258, 267, 427/282, 412.1, 412.3, 412.4, 412.5; 156/307.1, 307.3, 307.4, 281, 310; 428/195, 201, 203, 204, 507, 542.2

[56] References Cited

U.S. PATENT DOCUMENTS

| | | | |
|---|---|---|---|
| 3,949,044 | 4/1976 | Varini | 264/247 |
| 4,126,594 | 11/1978 | Peters et al. | 427/393.5 X |
| 4,293,603 | 10/1981 | Hayman-Chaffey et al. | 428/203 X |
| 4,400,423 | 8/1983 | Scher et al. | 427/267 X |
| 4,430,375 | 2/1984 | Scher et al. | 427/267 X |
| 5,021,278 | 6/1991 | Short | 428/204 X |

OTHER PUBLICATIONS

Derwent Abstract N85-236092.

*Primary Examiner*—Michael Lusignan
*Attorney, Agent, or Firm*—Davis, Bujold & Streck

[57] ABSTRACT

In this method of making a protective and/or decorative coating and the coating material thus made, the material preferably comprises a base plate (10) made of a synthetic polymer and a coloured layer (11) deposited on one of its surfaces which may be made of synthetic inks or replaced by natural timber. It preferably has a hard, abrasion resistant coating (13) on the front face and a protective coating (12) at the back face.

14 Claims, 1 Drawing Sheet

METHOD OF MAKING A PROTECTIVE AND/OR DECORATIVE COATING AND THE COATING MADE BY THIS METHOD

The present invention relates to a method of manufacturing a protective and/or decorative surfacing material adapted to be applied to any surface of an object, e.g. an element of furniture.

This invention relates also to a protective and/or decorative surfacing material manufactured by said method.

In recent times many attempts have been made to use synthetic materials in various forms to provide either decorative or protective coatings to various articles, such as articles of furniture for private or professional use.

Synthetic polymer materials have been commercially available in sheet form for approximately 40 years. These sheets are available in a variety of sizes and thicknesses and as well in a variety of forms and aspects. They may be sometimes transparent or translucent and sometimes colored. Such products are available from a number of manufacturers and are marketed under different names. "Hesalite" as manufactured by Bally CTU in Switzerland is a typical example, as well as transparent sheets marketed under the name "Plexiglas" and manufactured by Rohm GmbH in Switzerland too. Such products can be used to form decorative and/or protective surfaces either alone or in combination with other similar or different products.

The use of synthetic polymer sheeting to form protective and/or decorative surfaces or coatings has not been extensive in the past. Such coatings have not been found particularly effective in the practice for surface protection and there has therefore been only limited use of this product in this field.

Recently a number of manufacturers of synthetic polymers have introduced acylic sheeting with an additional abrasion resistant surface added to the material. The product marketed under the name "Plexiglas XT 230" and manufactured by Rohm GmbH in Germany is a typical example.

Synthetic surfacing materials which are supposed to offer both protection and coloration have been known for a number of years and comprise high pressure synthetic laminates, such as "Formica" and "Arborite" currently marketed world-wide. Additionally a product manufactured and marketed in the U.S.A. under the name of "Vitricor" comprises a sheet of transparent acrylic material, the back surface of which is covered by a layer of acrylic paint. Such materials are used generally in the form of plane sheets or plates. A process for manufacturing such a product is described in U.S. Pat. No. 4,293,603.

In spite of a variety of products existing nowadays, none of them has brought a satisfying answer to the problem of providing a surface coating which is both protective and decorative. None of these materials has been effective in producing both a decorative coating with a desirable apparent depth of colour which would provide sufficient protection to surfaces and which could be adapted to every shape of surface, and specifically to relatively small radius curved edges or 90 degree return edges. The known materials do not have both basic properties of (i) resistance to abrasion, and (ii) capability of conformation to all surfaces of whatever shape.

The prior art has made use of acrylic enamels or lacquers to colour coat the base plates on the assumption that these coatings would be compatible with and also would bond to said plates. It has not come up to these expectations and the manufacturers have encountered serious problem of adhesiveness, the colour coat tending to separate from the base plate.

In an attempt for solving this problem, the prior art has made use of a primer paint applied to the back of the colour layer to improve the bond between this layer and the material of the base plate. However all adhesion problems have not been solved for all that.

Finally the prior art materials were restricted in use as large flat sheets adapted to form coatings on planar surfaces or curved surfaces having a large curvature radius.

The prior art while offering materials with different hardness grades was restricted to use as flat or large radius curved ,coatings by the fact that the plates or sheets are not successfully thermofrmable With regard to the manufacturing process, the prior art products have been designed for limited production and all the techniques used were adapted to such a limited production. Finally, the prior art products have generally a thickness which is limited to a few tenths of millimeters, as a rule their thickness does not exceed or hardly exceed about 1 mm, resulting in an additional drawback in particular applications.

The principle object of this invention is to alleviate the different above-mentioned drawbacks by determining a method of making a surfacing material which is protective, i.e. resistant to abrasion, and decorative, i.e. having a surface aspect which may be extremely varied.

It is an additional object of this invention to provide a decorative and protective surface which may be coloured and or patterned to suite individual taste.

It is a further object of this invention to provide a protective and decorative surfacing material which can be formed to all specific contours so as to provide a versatility of use.

It is a further object of this invention to provide a protective and decorative surfacing material which can be manufactured with modern automated technics allowing sufficient quality control so as to provide large areas of material with identical features.

It is a further object of this invention to provide protective and decorative surfacing materials which can be attached to other surfaces by a wide variety of conventional methods including but not limited to hot melt glues, vinyl based glues, contact cements, which have been necessary for adhering the sheet materials of the prior art.

It is a further object of this invention to provide a protective and decorative surfacing material which in a specifically shaped or contoured formed is available with an extra abrasion resistant surface.

It is a further object of this invention to provide a protective and decorative surfacing material in a variety of thickness thereby achieving a variety of appearances and application opportunities.

It is an additional object of this invention to provide a protective and decorative surfacing material particularly for uses as wall cladding (interior or exterior), bathroom tub and furniture, desk, decorative plaques and panels, highway sound screens, direction panels or display stands, corporate identification plates, door cladding, ceiling paneling, games, jigsaw puzzles, movies screen, box facings and display units for jewellery, safe and desposit box facings, etc.

These objects are realized in this invention by a method of manufacturing a protective and/or decorative surfacing material adapted to be applied to any surface of an object, e.g. an element of furniture, characterized in that a sheet of synthetic polymer material is used as base support, in that said base support is prepared by cleaning, drying and by stabilizing or neutralizing static electrical charges thereof, in that a colour coating is applied by depositing on a back surface of the base support a coloured substance selected from the following materials polyester or acrylic inks, polyurethane paints, or in that a veneer of natural wood is bonded to said back surface by means of an acrylic adhesive, in that polymerization is then produced and in that drying is carried out by means of a hot air stream to evaporate excess solvents.

In a preferred embodiment, the base support is cleaned by one of the following techniques sand blasting, metal bead blasting, high pressure air jet, deglazing, solvent washing.

In a particularly advantageous embodiment, the colour coating is applied by depositing a coloured substance by one of the following processes colour screening, spraying, roller applicator, brushing, paint jet.

Said coloured substance preferably includes at least one of the following compositions polyester-based or acrylic synthetic inks, dye, resin bonded colour pigments, polyurethane paint.

For providing a surface layer which is particularly hard, an additional abrasion resistant layer maybe applied on the front surface of the surfacing material A protective layer is preferably applied over the colour coating on the back surface of the material.

Preferably, a stage of drying and curing takes place after application of the protective layer.

In an advantageous embodiment said heat curing is carried out for a period of about 12 to 18 hours.

In another particularly advantageous embodiment, a high density and thermoformable synthetic material including an ultraviolet filtering agent is used as base support, and preferably an appropriate shape of said base support is realised by thermoforming.

The surfacing material according to the invention, manufactured by this method, is characterized in that it comprises a base support formed of a sheet of synthetic polymer material, a coloured layer of a substance selected from polyester inks or acrylic inks or a polyurethane paint, or a veneer of natural wood being bonded by means of an acrylic adhesive.

In a preferred embodiment, the surfacing material comprises a front surface having a hard, abrasion resistant layer.

Furthermore a particularly advantageous embodiment comprises a protective layer applied over said coloured layer on a back surface of the material.

Said base support may be a sheet of a high density, thermoformable synthetic material including an ultraviolet filtering agent.

The present invention will be better understood with reference to description of examples of embodiments and of the appended drawing, wherein:

Figure 1:
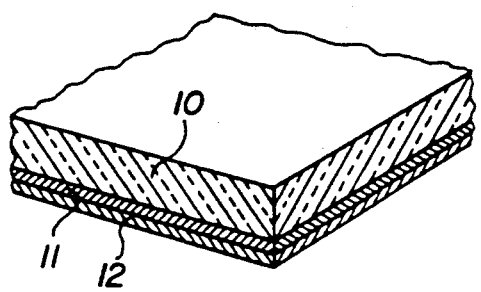
FIG. 1 is a perspective view of a first embodiment of a surfacing material according to this invention.

The manufacturing process according to the present invention begins with use of a raw material in the form of a base plate or sheet being obtained by casting or extrusion and made of synthetic polymer material which is normally clear and transparent. However one can also use, to obtain certain visual effects, base supports which are coloured or toned and which have varying degrees of transparency. Additionally, appropriately structured or patterned sheets may be used.

This kind of material is usual and commercially available in the raw surface conditions or with a pre-applied hardened surface layer. It is available in a range of sizes or thickness. For example one suitable starting material for production of this invention is the product marketed under the name SUINKOLITE by Mitsubishi Corporation, or the product "plexiglas XT 230" marketed by Rohm GmbH.

As mentioned above, a material having a hardened surface is also available for use. For example, such a material is marketed under the name SUINKOLITE MR. This product being already provided with a hardened surface eliminates the requirement for this step during the manufacturing process. The presence of this hardened layer does however impose some limitations and therefore the use of this product is somewhat limited.

In the first stage of the process, the synthetic polymer sheet is cleaned of any residual compounds such as glues, dust, dirt or other contaminents which may adversely affect the properties of the base support or the subsequent steps of the manufacturing process.

The substrata plate is next coated on one side, namely its back side, or a portion thereof, with a colouring compound which may be a synthetic ink, e.g. a polyester-based or acrylic ink, a dye or resin bonded pigments, for example polyurethane paints.

The coloured coating layer may be applied in one operation or in a sequence of operations permitting to obtain the desired effect. It may be brushed, roller coated, sprayed by airless gun, air-gun, or air brush, or screen transferred. Of course, the coloured coating layer may be uniformly applied or applied sequentially, or with use of masks or patterns for obtaining different desired effects.

Following the colour application the material passes through a curing and drying stage wherein the excess solvents are removed by evaporation Upon completion of the colouring stage, a protective coating is applied by conventional spray, roller, jet or other technique to the back surface of the material, onto the coloured layer. This coating is also selectively pigmented to produce a definitive and identifiable coloured appearance to the back of the product.

The product then passes through a second drying-/curing stage similar to that which followed the colour application process.

The product now proceeds either to finished product inventory or to surface hardening procedure.

In the case of the product which is to be submitted to a surface hardening process, a compound of silica maybe deposited onto said surface, said compound comprising preferably a colloidal solution of silica in a synthetic solvent. Deposition is carried out by conventional methods such as spraying or similar. The product is transferred to a curing room where it remains for approximately 12–18 hours at an elevated temperature. After this curing, period resulting in a hard surface layer which is abrasion-resistant, the material is generally complete. However a surface protection may be provided by addition of paper or plastic protective sheets to both front or back surfaces of the material.

It is worthy of note that the stage of applying the coloured layer may be replaced by a stage of securing a veneer of natural wood.

In the instances where specific products to be covered by the protective or decorative surfacing material have particular forms, the substrata may be shaped by heat application. Heat can be applied from any appropriate source such as hot air sources, radiant or contact heaters. This shaping stage can take place either before or after the colour process.

The described above can be applied to any non-hardened starting material of the above-defined kind having a thickness varying from 0.5 mm to about 5 mm. However, in particular applications such a material is available in thicknesses up to and including 50 mm.

Figure 2:
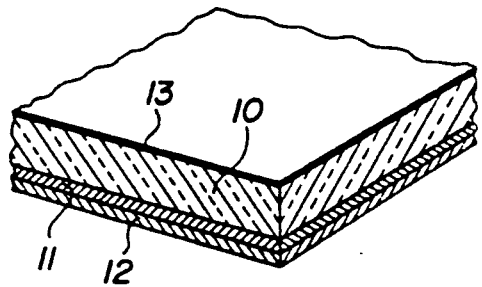
FIG. 2 is a perspective view of another embodiment of a surfacing material according to this invention.

Referring now to FIG. 1 and 2, the protective and/or decorative covering obtained by the above-described process comprises a base support 10 formed of a sheet of high density polymer synthetic material including a filtration agent for ultraviolet radiation, a paint layer 1 which may be replaced by a veneer of natural wood, and a protective layer 12 which forms the back surface of the product. As shown in FIG. 2, the front surface may have a hardened surface layer 13.

Figure 3A:
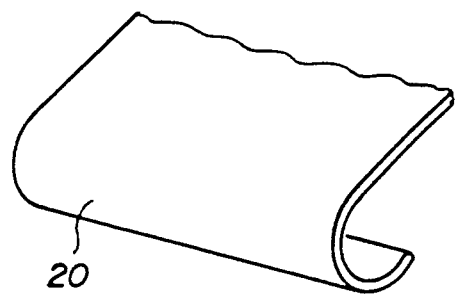
FIG. 3A 3B and 3C show three particular forms of a surfacing material according to this invention.
Figure 3B:
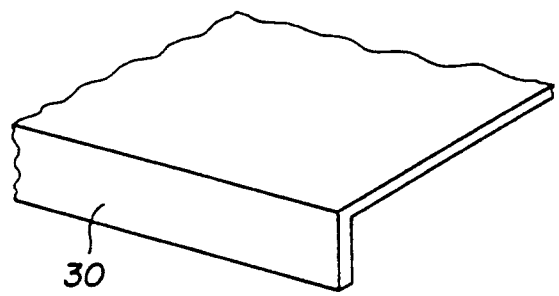
Figure 3C:
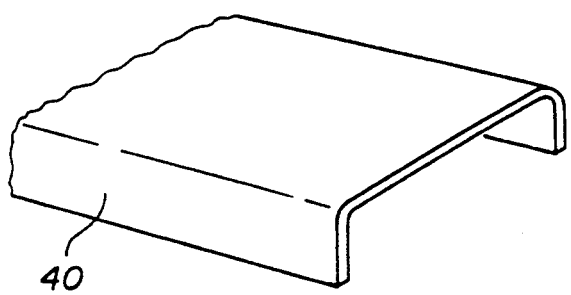

FIG. 3A, 3B and 3C show covering materials having respectively a curved rim 20 (FIG. 3A), a rim 30 which is bent at right angle (FIG. 3B) and a U-shaped profile 40 (FIG. 3C).

The present invention is not limited to the above-described embodiments, but also comprises different modifications and variations being obvious to person skilled in the art.

I claim:

1. A method of manufacturing a protective decorative surfacing laminate configured to be applied to any surface of an object comprising the steps of:
   a) providing a sheet of synthetic polymer base support, having front and back faces;
   b) cleaning and drying the sheet;
   c) at least one of stabilizing and neutralizing static electrical charges on the cleaned and dried sheet;
   d) applying a coating to the back face of the sheet, the coating comprising at least one of polyester ink, acrylic ink, dye, resin bonded pigments and polyurethane paint;
   e) applying a protective layer over the exposed surface of the coating, the protective layer being suitable for attachment to an objection; and
   f) simultaneously curing and drying the coating and the layer.

2. The method according to claim 1 comprising applying an abrasion resistant layer on the front face of the sheet.

3. The method according to claim 1, comprising cleaning the sheet by one of sand blasting, metal bead blasting, high pressure air jet, deglazing and solvent washing.

4. The method according to claim 1, comprising applying the coating by one of color screening, spraying, roller application, brushing and paint jet.

5. The method according claim 2, comprising heat curing the resistant layer for a period of about 12 hours to about 18 hours.

6. The method according to claim 1, wherein the synthetic polymer is a high density and thermoformable synthetic material including an ultraviolet filtering agent.

7. The method according claim 1, comprising thermoforming the sheet into a desired shape.

8. A protective decorative surfacing material, manufactured by a method according to claim 1, comprising a base support formed of a sheet (10) of synthetic polymer material having a front face and a back face, a layer (11) of at least one of polyester ink, acrylic ink, dye, resin bonded pigment and polyurethane paint applied to the back face, the layer being covered by a protective layer applied thereto.

9. A material according to claim 8, comprising a hard, abrasion resistant layer (13) applied to the front face.

10. A material according to claim 8, wherein said base support is a sheet of a high density, thermoformable synthetic material including an ultraviolet filtering agent.

11. A method of manufacturing a protective decorative surfacing laminate configured to be applied to any surface of an object comprising the steps of:
   a) providing a sheet of synthetic polymer base support, having front and back faces;
   b) cleaning, drying the sheet;
   c) at least one of stabilizing and neutralizing static electrical charges on the cleaned and dried sheet;
   d) applying a veneer of natural wood to the back face of the sheet by means of an acrylic adhesive;
   e) applying a protective layer over the exposed surface of the veneer, the protective layer being suitable for attachment to an object; and
   f) simultaneously curing and drying the adhesive and layer.

12. A protective decorative surfacing material, manufactured by a method according to claim 11, comprising a base support formed of a sheet (10) of synthetic polymer material having a front face and a back face, a veneer of natural wood applied to the back face, the veneer being covered by a protective layer applied thereto.

13. A material according to claim 12, comprising a hard, abrasion resistant layer (13) applied to the front face.

14. A material according to claim 12, wherein said base support is a sheet of a high density, thermoformable synthetic material including an ultraviolet filtering agent.

* * * * *